(12) United States Patent
Hojabri

(10) Patent No.: US 7,403,233 B1
(45) Date of Patent: Jul. 22, 2008

(54) VIDEO CIRCUITRY FOR CONTROLLING SIGNAL GAIN AND REFERENCE BLACK LEVEL

(75) Inventor: Peyman Hojabri, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 524 days.

(21) Appl. No.: 11/058,449

(22) Filed: Feb. 15, 2005

Related U.S. Application Data

(63) Continuation of application No. 10/830,338, filed on Apr. 22, 2004, now Pat. No. 7,236,203.

(51) Int. Cl.
*H04N 5/68* (2006.01)

(52) U.S. Cl. .................................... 348/379

(58) Field of Classification Search ............... 348/691, 348/689, 673, 379, 380, 377, 473, 678, 687, 348/692, 694
See application file for complete search history.

(56) References Cited

U.S. PATENT DOCUMENTS

| | | | | |
|---|---|---|---|---|
| 3,637,921 | A * | 1/1972 | Abel | 348/692 |
| 4,207,592 | A * | 6/1980 | Harwood | 348/692 |
| 4,323,923 | A | 4/1982 | Reneau | |
| 4,496,982 | A | 1/1985 | Levine | |
| 4,547,979 | A * | 10/1985 | Harada et al. | 36/30 R |
| 4,549,215 | A * | 10/1985 | Levine | 348/257 |
| 4,633,320 | A | 12/1986 | Willis | |
| 4,642,690 | A * | 2/1987 | Hinn | 348/673 |
| 5,107,189 | A * | 4/1992 | Page | 315/383 |
| 5,351,129 | A | 9/1994 | Lai | |
| 5,386,247 | A | 1/1995 | Shafer et al. | |
| 5,461,398 | A | 10/1995 | Tang et al. | |
| 5,568,202 | A | 10/1996 | Koo | |
| 5,610,664 | A | 3/1997 | Bobert | |
| 5,786,864 | A | 7/1998 | Yamamoto | |
| 5,838,388 | A | 11/1998 | Blanc | |
| 5,953,004 | A | 9/1999 | Cho | |
| 6,069,660 | A | 5/2000 | Sato | |
| 6,166,579 | A | 12/2000 | Hojabri et al. | |
| 6,191,760 | B1 * | 2/2001 | Jun et al. | 345/20 |
| 6,226,047 | B1 | 5/2001 | Ryu | |
| 6,476,821 | B2 | 11/2002 | Sawada et al. | |
| 6,498,857 | B1 | 12/2002 | Sibbald | |
| 6,597,395 | B1 | 7/2003 | Kim et al. | |
| 6,650,371 | B1 * | 11/2003 | Morrish et al. | 348/569 |
| 6,937,294 | B1 | 8/2005 | Hojabri | |
| 7,184,099 | B1 | 2/2007 | Hojabri | |
| 7,236,203 | B1 * | 6/2007 | Hojabri | 348/379 |

OTHER PUBLICATIONS

U.S. Appl. No. 09/698,739, filed Oct. 27, 2000, Hojabri.

(Continued)

*Primary Examiner*—Paulos M. Natnael
(74) *Attorney, Agent, or Firm*—Vedder Price P.C.

(57) ABSTRACT

A multi-channel video signal processing circuit with a bias control and respective video channel gain controls. The bias signal, which corresponds to a nominal video signal brightness level, is shared among the video channels which, in accordance with respective video gain control signals, process incoming component video signals to provide corresponding outgoing component video signals such that each one of the outgoing component video signals has a nominal outgoing video signal brightness level related to the bias signal and a corresponding one of the gain control signals.

20 Claims, 4 Drawing Sheets

OTHER PUBLICATIONS

U.S. Appl. No. 10/439,485, filed May 16, 2003, Hojabri.
U.S. Appl. No. 10/685,378, filed Oct. 14, 2003, Hojabri.
U.S. Appl. No. 10/830,338, filed Apr. 22, 2004, Hojabri.
U.S. Appl. No. 10/685,378, filed Oct. 14, 2003, Hojabri, entitled "Multiplexed Video Signal Interface Signal, System and Method".

* cited by examiner

VIDEO CIRCUITRY FOR CONTROLLING SIGNAL GAIN AND REFERENCE BLACK LEVEL

This is a continuation of U.S. patent application Ser. No. 10/830,338, filed on Apr. 22, 2004 now U.S. Pat. No. 7,236,203, and entitled "Video Circuitry For Controlling Signal Gain And Reference Black Level".

BACKGROUND OF THE INVENTION

1. Field of the Invention

The present invention relates to video amplifier circuitry for controlling a signal to be displayed on a display device such as a cathode ray tube (CRT), and in particular, to video circuitry for controlling signal gain and reference block level of a video signal.

2. Description of the Related Art

Video display devices are used for many purposes, including video monitors for displaying video images generated by computers and televisions for displaying animated or live action video images such as those received over cable or broadcast systems. One of the more common types of video display devices uses a cathode ray tube (CRT) to display the video image information. As is well known, the CRT includes three primary color cathode ray guns which are manipulated to converge on a screen and produce a color image. The three ray guns produce converged scanning rasters having red, green and blue fields which combine to produce all colors from black through white. For manufacturers of such display devices, one important requirement is that of establishing and maintaining color balance by appropriately balancing the signals driving the red, green and blue (RGB) cathodes of the CRT. This is generally quite difficult since adjusting independent video gain stages for each channel (red, green and blue) often conflicts with establishing and maintaining proper reference black level, or brightness, adjustment for each channel.

SUMMARY OF THE INVENTION

In accordance with the presently claimed invention, a multi-channel video signal processing circuit is provided with a bias control and respective video channel gain controls. The bias signal, which corresponds to a nominal video signal brightness level, is shared among the video channels which, in accordance with respective video gain control signals, process incoming component video signals to provide corresponding outgoing component video signals such that each one of the outgoing component video signals has a nominal outgoing video signal brightness level related to the bias signal and a corresponding one of the gain control signals.

In accordance with one embodiment of the presently claimed invention, a multi-channel video signal processing circuit with a bias control and respective video channel gain controls includes bias control circuitry and video signal amplification circuitry. The bias control circuitry is responsive to a bias control signal by providing a bias signal corresponding to a nominal video signal brightness level. The video signal amplification circuitry is coupled to the bias control circuitry and responsive to the bias signal, a plurality of gain control signals and a plurality of incoming component video signals by providing a corresponding plurality of outgoing component video signals. Ratios of corresponding ones of the pluralities of outgoing and incoming component video signals have respective values related to corresponding ones of the plurality of gain control signals, and each one of the plurality of outgoing component video signals has a nominal outgoing video signal brightness level related to the bias signal and a corresponding one of the plurality of gain control signals.

In accordance with another embodiment of the presently claimed invention, a multi-channel video signal processing circuit with a bias control and respective video channel gain controls includes bias controller means and video signal amplifier means. The bias controller means is for receiving a bias control signal and in response thereto generating a bias signal corresponding to a nominal video signal brightness level. The video signal amplifier means is for receiving the bias signal, a plurality of gain control signals and a plurality of incoming component video signals and in response thereto generating a corresponding plurality of outgoing component video signals. Ratios of corresponding ones of the pluralities of outgoing and incoming component video signals have respective values related to corresponding ones of the plurality of gain control signals, and each one of the plurality of outgoing component video signals has a nominal outgoing video signal brightness level related to the bias signal and a corresponding one of the plurality of gain control signals.

In accordance with still another embodiment of the presently claimed invention, a method for processing a plurality of video signals with a bias control and respective video channel gain controls includes:

receiving a bias control signal and in response thereto generating a bias signal corresponding to a nominal video signal brightness level; and receiving the bias signal, a plurality of gain control signals and a plurality of incoming component video signals and in response thereto generating a corresponding plurality of outgoing component video signals;

wherein ratios of corresponding ones of the pluralities of outgoing and incoming component video signals have respective values related to corresponding ones of the plurality of gain control signals, and each one of the plurality of outgoing component video signals has a nominal outgoing video signal brightness level related to the bias signal and a corresponding one of the plurality of gain control signals.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators.

Figure 1:
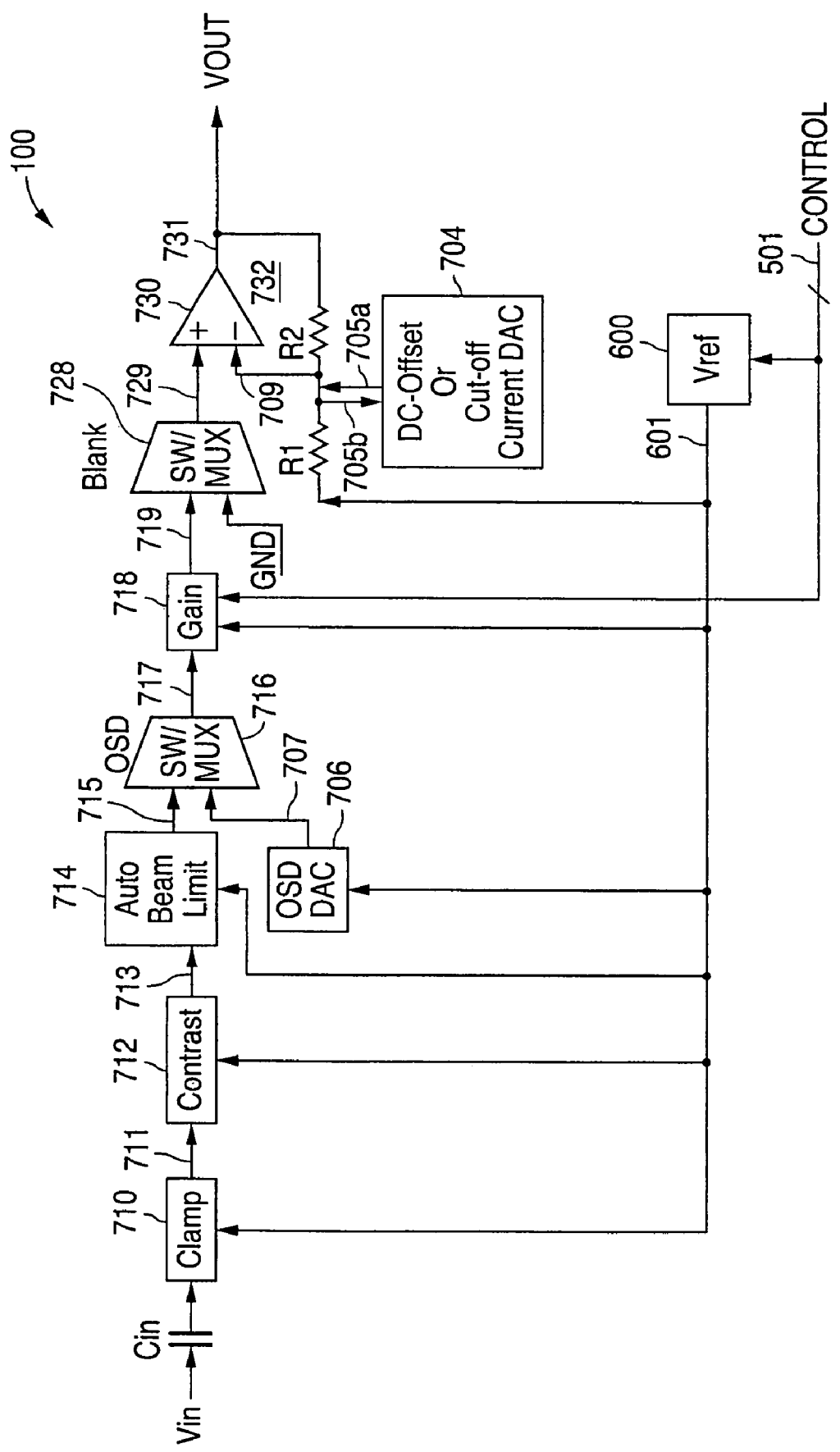
FIG. 1 is a functional block diagram of a portion of a video system for driving a video display device containing video circuitry in accordance with one embodiment of the presently claimed invention.

Referring to FIG. 1, a portion 100 of a video system including video circuitry for controlling signal gain and reference black level of a video signal in accordance with one embodiment of the presently claimed invention can be described as follows. (It should be understood that this portion 100 represents one video channel of a typical system, with three such channels being used for RGB control.) This subsystem 100 includes a clamp circuit 710, contrast control circuit 712, auto beam limit circuit 714, an on-screen-display (OSD) data source 706, a switch or multiplexor 716, a video gain circuit 718, another switch or multiplexor 728, output offset circuitry 732, and a voltage reference source 600, all connected substantially as shown. As indicated, the clamp circuit 710, contrast control circuit 712, auto beam limit circuit 714, OSD data source 706, video gain circuit 718 and output offset circuitry 732 are biased by a reference voltage 601 provided by the voltage reference generator circuit 600 (discussed in more detail below).

An incoming video signal Vin is AC-coupled with a coupling capacitor Cin to provide an AC-coupled signal to the clamp circuit 710. The DC-clamped signal 711 is then processed by the contrast control circuit 712 in accordance with contrast control signals (not shown) and the reference voltage 601 to establish the contrast for the incoming video signal. The contrast-controlled signal 713 is then processed by the auto beam limit circuit 714 (various forms of which are well known in the art) in accordance with an ABL control signal (not shown) and the reference voltage 601.

The resulting video signal 715 is then selectively combined in the switch or multiplexor 716 with OSD data 707. The resulting signal 717 is controlled with respect to signal gain by the video gain circuit 718 in accordance with the reference voltage 601 and a control signal 501 (discussed in more detail below). The resulting gain-controlled signal 719, which has now been DC-clamped, controlled for video contrast, controlled for beam signal strength, selectively combined with OSD data, and controlled for video gain, is then selectively combined with a blanking signal in the switch or multiplexor 728. The resulting signal 729 then has a DC offset voltage added to it within the offset circuitry 732 to produce the final video output signal 731.

The output offset circuitry 732 selectively introduces a DC offset voltage by establishing a reference offset voltage 709 at one input of the amplifier 734. This voltage is produced as a combination of the reference voltage 601 summing with the voltage generated in the voltage divider circuit composed of resistors R1 and R2 depending upon the value of the current 705 provided by the current source circuit 704 (e.g., a current digital-to-analog converter) as either a source current 705a or sinking current 705b.

A more detailed discussion of this video signal path can be found in commonly assigned, co-pending U.S. patent application Ser. No. 09/698,739, entitled "Multiplexor Video Signal Interface Signal System and Method", the disclosure of which is incorporated herein by reference.

As can be seen in FIG. 1, the signal gain of the video signal is controlled by a control signal 501. This same control signal 501 also controls the voltage reference generator 600 which provides the common, or shared, reference voltage 601 used to establish and maintain the reference black level of the video signal as it is processed by the various stages. Accordingly, when the video signal gain or the reference black level for the subject video signal is adjusted, a corresponding adjustment is made for the reference black level or video signal gain, respectively, thereby providing mutual tracking for such signal characteristics.

Figure 2:
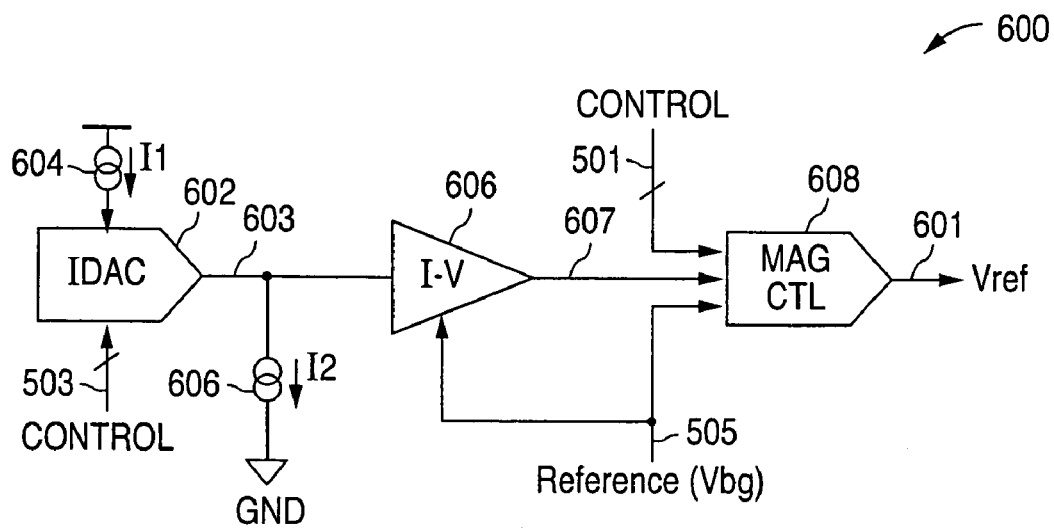
FIG. 2 is a functional block diagram of a voltage reference generator in accordance with one embodiment of the presently claimed invention.

Referring to FIG. 2, a preferred embodiment of the voltage reference generator 600 for use in the circuit of FIG. 1 includes voltage source circuitry and voltage conversion circuitry. One embodiment of the voltage source circuitry includes a current DAC 602 and a current-to-voltage converter 606. In the current DAC 602, a source current I1 provided by a current source 604 is converted to an output current 603 in accordance with a digital control signal 503. This output current 603, variable (e.g., proportional) in accordance with the control signal 503, is summed with a sinking current I2 provided by another current source 606 to produce a net current for conversion by the current-to-voltage converter 606.

The resulting voltage 607 is used as an input voltage for the voltage conversion circuitry, which in this example embodiment, is implemented using a voltage magnitude control circuit 608 which provides the analog reference voltage Vref 601 based upon the input voltage 607 in accordance with the value of the digital control signal 501 (e.g., proportional) which is also used to control the video gain, as discussed above. The reference voltage 505, preferably established by a stable voltage source, such as a bandgap voltage source (many types of which are well known in the art), also provides the voltage reference for the current-to-voltage converter 606. The net result is that the reference voltage 601 has a nominal voltage level equal to the reference voltage 505 which can be adjusted upward (more positive) or downward (more negative) in accordance with the binary value of the digital control signal 501 (discussed in more detail below).

This magnitude control circuit 608 used to establish the reference voltage 601 is preferably the same type of circuitry as that used for the video gain controller 718. A more detailed discussion of this type of magnitude control circuit can be found in U.S. Pat. No. 6,166,579, entitled "Digitally Controlled Signal Magnitude Control Circuit", the disclosure of which is incorporated herein by reference.

Figure 3:
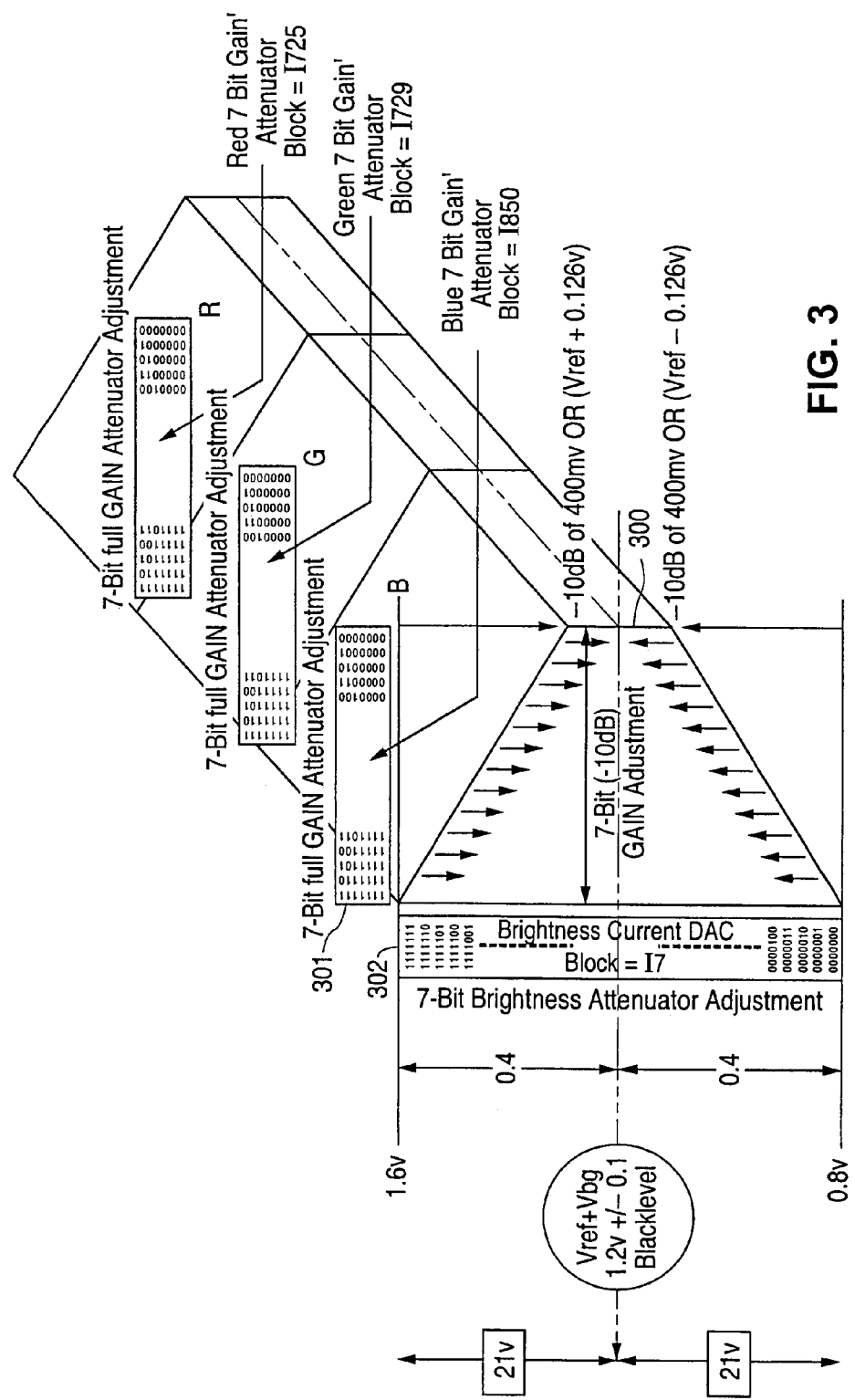
FIG. 3 illustrates the video gain and brightness control adjustment capabilities of the circuit of FIG. 1.

Referring to FIG. 3, the adjustment and tracking of the video signal gain and reference black level can be better understood. As discussed above, the nominal reference black level is equal to the internal reference voltage 505, e.g., 1.2 volts for a bandgap reference voltage. For one embodiment of the circuitry used for the magnitude control circuit 608 and video gain controller 718, the control signal 501 is a 7-bit signal and equal voltage adjustments of 400 millivolts more positive and more negative are available, thereby establishing a reference black level within the range of 0.8 volts through 1.6 volts over the full range of the digital control signal 501. Box 301 identifies the full range of adjustment for the video gain controller 718, which for this example of a 7-bit control signal 501, provides a 10 dB gain adjustment. Box 302 identifies the full range of the 7-bit control signal 501 for controlling the reference black level over the range of 0.8 volts through 1.6 volts. This 800 millivolt adjustment range translates to a 42-volt (+/−21 volts) adjustment range at the cathodes of a typical CRT (not shown).

Figure 4:
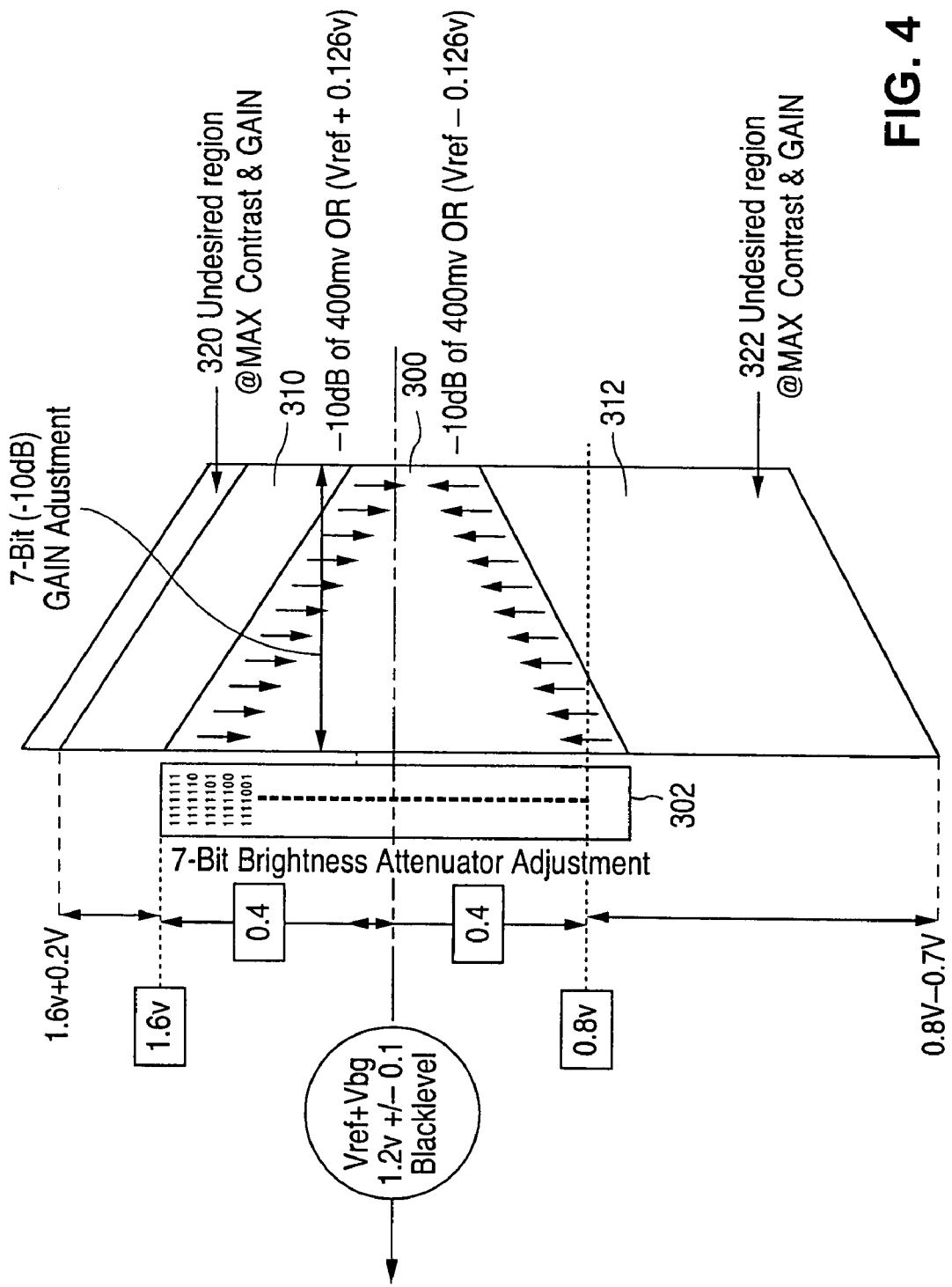
FIG. 4 further illustrates such video gain and brightness control adjustment capabilities.

Referring to FIG. 4, the effect of the output offset circuitry 732 can be better understood. As illustrated, additional output offset voltages in the range of −0.7 volt through +0.2 volt is available to shift the nominal center of the output video signal Vout 731.

Figure 5:
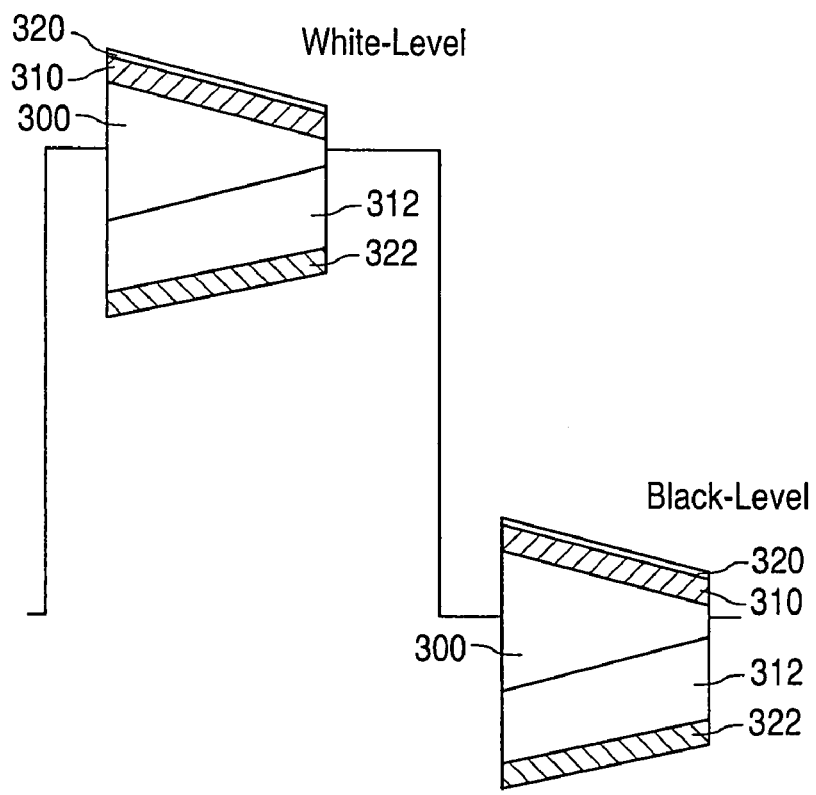
FIG. 5 illustrates the effects of such video gain and brightness control adjustments for the white and black levels of a video signal.

Referring to FIG. 5, the net effect for the white and black levels of the output video signal Vout is illustrated.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a multi-channel video signal processing circuit with a bias control and respective video channel gain controls, comprising:
   bias control circuitry responsive to a bias control signal by providing a bias signal corresponding to a nominal video signal brightness level; and
   video signal amplification circuitry coupled to said bias control circuitry and responsive to said bias signal, a plurality of gain control signals and a plurality of incoming component video signals by providing a corresponding plurality of outgoing component video signals;
   wherein
      ratios of corresponding ones of said pluralities of outgoing and incoming component video signals have respective values related to corresponding ones of said plurality of gain control signals, and
      each one of said plurality of outgoing component video signals has a nominal outgoing video signal brightness level related to said bias signal and a corresponding one of said plurality of gain control signals.

2. The apparatus of claim 1, wherein:
   each one of said plurality of nominal outgoing video signal brightness levels is related to said bias signal; and
   each one of said plurality of nominal outgoing video signal brightness levels is related to said corresponding one of said plurality of gain control signals independently from each other one of said plurality of nominal outgoing video signal brightness levels.

3. The apparatus of claim 1, wherein each one of said plurality of nominal outgoing video signal brightness levels is substantially proportional to a respective combination of said bias signal and a corresponding one of said plurality of gain control signals.

4. The apparatus of claim 1, wherein:
   said bias signal includes a range of values with minimum and maximum values;
   each one of said plurality of gain control signals includes a range of values with minimum and maximum values; and
   each one of said plurality of nominal outgoing video signal brightness levels includes a range of values with minimum and maximum nominal values related to a respective combination of said minimum and maximum values of said bias signal and said minimum and maximum values of a corresponding one of said plurality of gain control signals, respectively.

5. The apparatus of claim 4, wherein each one of said minimum and maximum nominal values of said plurality of nominal outgoing video signal brightness levels is substantially proportional to said respective combination of said minimum and maximum values of said bias signal and said minimum and maximum values of a corresponding one of said plurality of gain control signals, respectively.

6. The apparatus of claim 1, wherein:
   said bias control signal comprises a digital control signal; and
   said bias control circuitry comprises signal conversion circuitry, including digital-to-analog conversion circuitry, responsive to said digital control signal by providing a corresponding analog control signal.

7. The apparatus of claim 6, wherein:
   said signal conversion circuitry further includes current source and sink circuitry and current-to-voltage conversion circuitry;
   said digital-to-analog conversion circuitry, coupled to said current source and sink circuitry, is responsive to said digital control signal and a source current by providing an analog current signal; and
   said current-to-voltage conversion circuitry, coupled to said digital-to-analog conversion circuitry, is responsive to said analog current signal by providing an analog voltage signal as said analog control signal.

8. The apparatus of claim 1, wherein said video signal amplification circuitry comprises
   signal scaling circuitry responsive to said bias signal and said plurality of gain control signals by providing a plurality of reference signals; and
   a plurality of video amplifier circuits coupled to said signal scaling circuitry and responsive to said plurality of reference signals, said plurality of gain control signals and said plurality of incoming component video signals by providing said corresponding plurality of outgoing component video signals, wherein each one of said plurality of nominal outgoing video signal brightness levels is related to a respective one of said plurality of reference signals.

9. An apparatus including a multi-channel video signal processing circuit with a bias control and respective video channel gain controls, comprising:
   bias controller means for receiving a bias control signal and in response thereto generating a bias signal corresponding to a nominal video signal brightness level; and
   video signal amplifier means for receiving said bias signal, a plurality of gain control signals and a plurality of incoming component video signals and in response thereto generating a corresponding plurality of outgoing component video signals;
   wherein
      ratios of corresponding ones of said pluralities of outgoing and incoming component video signals have respective values related to corresponding ones of said plurality of gain control signals, and
      each one of said plurality of outgoing component video signals has a nominal outgoing video signal brightness level related to said bias signal and a corresponding one of said plurality of gain control signals.

10. The apparatus of claim 9, wherein:
   each one of said plurality of nominal outgoing video signal brightness levels is related to said bias signal; and
   each one of said plurality of nominal outgoing video signal brightness levels is related to said corresponding one of said plurality of gain control signals independently from each other one of said plurality of nominal outgoing video signal brightness levels.

11. The apparatus of claim 9, wherein each one of said plurality of nominal outgoing video signal brightness levels is substantially proportional to a respective combination of said bias signal and a corresponding one of said plurality of gain control signals.

12. The apparatus of claim 9, wherein:
said bias signal includes a range of values with minimum and maximum values;
each one of said plurality of gain control signals includes a range of values with minimum and maximum values; and
each one of said plurality of nominal outgoing video signal brightness levels includes a range of values with minimum and maximum nominal values related to a respective combination of said minimum and maximum values of said bias signal and said minimum and maximum values of a corresponding one of said plurality of gain control signals, respectively.

13. The apparatus of claim 12, wherein each one of said minimum and maximum nominal values of said plurality of nominal outgoing video signal brightness levels is substantially proportional to said respective combination of said minimum and maximum values of said bias signal and said minimum and maximum values of a corresponding one of said plurality of gain control signals, respectively.

14. A method for processing a plurality of video signals with a bias control and respective video channel gain controls, comprising:
receiving a bias control signal and in response thereto generating a bias signal corresponding to a nominal video signal brightness level; and
receiving said bias signal, a plurality of gain control signals and a plurality of incoming component video signals and in response thereto generating a corresponding plurality of outgoing component video signals;
wherein
ratios of corresponding ones of said pluralities of outgoing and incoming component video signals have respective values related to corresponding ones of said plurality of gain control signals, and
each one of said plurality of outgoing component video signals has a nominal outgoing video signal brightness level related to said bias signal and a corresponding one of said plurality of gain control signals.

15. The method of claim 14, wherein:
each one of said plurality of nominal outgoing video signal brightness levels is related to said bias signal; and
each one of said plurality of nominal outgoing video signal brightness levels is related to said corresponding one of said plurality of gain control signals independently from each other one of said plurality of nominal outgoing video signal brightness levels.

16. The method of claim 14, wherein each one of said plurality of nominal outgoing video signal brightness levels is substantially proportional to a respective combination of said bias signal and a corresponding one of said plurality of gain control signals.

17. The method of claim 14, wherein:
said bias signal includes a range of values with minimum and maximum values;
each one of said plurality of gain control signals includes a range of values with minimum and maximum values; and
each one of said plurality of nominal outgoing video signal brightness levels includes a range of values with minimum and maximum nominal values related to a respective combination of said minimum and maximum values of said bias signal and said minimum and maximum values of a corresponding one of said plurality of gain control signals, respectively.

18. The method of claim 17, wherein each one of said minimum and maximum nominal values of said plurality of nominal outgoing video signal brightness levels is substantially proportional to said respective combination of said minimum and maximum values of said bias signal and said minimum and maximum values of a corresponding one of said plurality of gain control signals, respectively.

19. The method of claim 14, wherein:
said bias control signal comprises a digital control signal; and
said receiving a bias control signal and in response thereto generating a bias signal corresponding to a nominal video signal brightness level comprises receiving said digital control signal and in response thereto generating a corresponding analog control signal.

20. The method of claim 14, wherein receiving said bias signal, a plurality of gain control signals and a plurality of incoming component video signals and in response thereto generating a corresponding plurality of outgoing component video signals comprises:
scaling said bias signal and said plurality of gain control signals to generate a plurality of reference signals; and
receiving said plurality of reference signals, said plurality of gain control signals and said plurality of incoming component video signals and in response thereto generating said corresponding plurality of outgoing component video signals, wherein each one of said plurality of nominal outgoing video signal brightness levels is related to a respective one of said plurality of reference signals.

* * * * *